APPARATUS FOR SUBMARINE CORE DRILLING

Original Filed Nov. 29, 1965 2 Sheets-Sheet 1

INVENTORS
PIERRE GROLET
PIERRE MOULIN
JEAN PAROLA
BY Krafft & Wells
ATTORNEYS

APPARATUS FOR SUBMARINE CORE DRILLING

Original Filed Nov. 29, 1965 2 Sheets-Sheet 2

INVENTORS
PIERRE GROLET
PIERRE MOULIN
JEAN PAROLA
BY Krafft & Wells
ATTORNEYS

United States Patent Office

Re. 27,292
Reissued Feb. 22, 1972

27,292

APPARATUS FOR SUBMARINE CORE DRILLING

Pierre Grolet, Pierre Moulin, and Jean Parola, Rueil Malmaison, France, assignors to Institut Francais du Petrole des Carburants et Lubrifiants, Rueil Malmaison, France Original No. 3,370,656, dated Feb. 27, 1968, Ser. No. 510,285, Nov. 29, 1965. Application for reissue Feb. 27, 1970, Ser. No. 15,305
Int. Cl. E21b 7/12
U.S. Cl. 175—6 5 Claims

Matter enclosed in heavy brackets [ ] appears in the original patent but forms no part of this reissue specification; matter printed in italics indicates the additions made by reissue.

ABSTRACT OF THE DISCLOSURE

A submarine core drilling apparatus comprising a basic structure which is suspended by a supporting cable from the surface installation. A flexible conduit is wound upon a storage reel which in turn is carried by the basic structure. The free end of the conduit is connected to a rigid tubular part comprising a bottom motor operatively connected to a core drill at its lower end. The apparatus further comprises means for guiding the rigid tubular part above the sea bottom, means supported by the basic structure for feeding water under pressure into the conduit, means associated with the conduit storage reel to control the unwinding of the flexible conduit when the core drill is lowered and advanced into the underwater strata, and at least one cable which may or may not be distinct from the supporting cable. This cable contains electric power and has control and command conductors connected to a source of electric energy and a switchboard on the surface installation.

The present invention relates to an improved apparatus for submarine core drilling.

It is an object of the present invention to provide a new apparatus for the deep under-water drilling of cores below the superficial layers of sediments, muds and other materials with little hardners.

A particularly object of the invention is to provide an apparatus for submarine core drilling having a core drill driven by an under-water electric motor at the bottom of the ocean, sea or other body of water.

The apparatus of this invention comprises a basic structure which is suspended by a supporting cable from a surface installation so as to be lowered to the bottom of the water where this basic structure is laid.

The submarine core drilling apparatus also comprises a flexible conduit wound upon a storage reel which is carried by the basic structure. The conduit has its free end connected to a rigid tubular part comprising a bottom motor operatively connected to a core drill at its lower end. The apparatus also comprises means for guiding said rigid part above the sea bottom, means supported by the basic structure for feeding water under pressure into the conduit, means associated with the conduit storage reel to control the unwinding of the flexible conduit in accordance with the lowering of the core drill and its advance into the under-water strata, at least one cable which may or may not be distinct from the supporting cable, said cable comprising electric power, control and command conductors connected to a source of electric energy and to a switchboard on the surface installation.

The invention will be described more in detail by referring to the annexed drawings, showing a particular embodiment of one form of this invention but not in any manner limited thereto.

Figure 1:
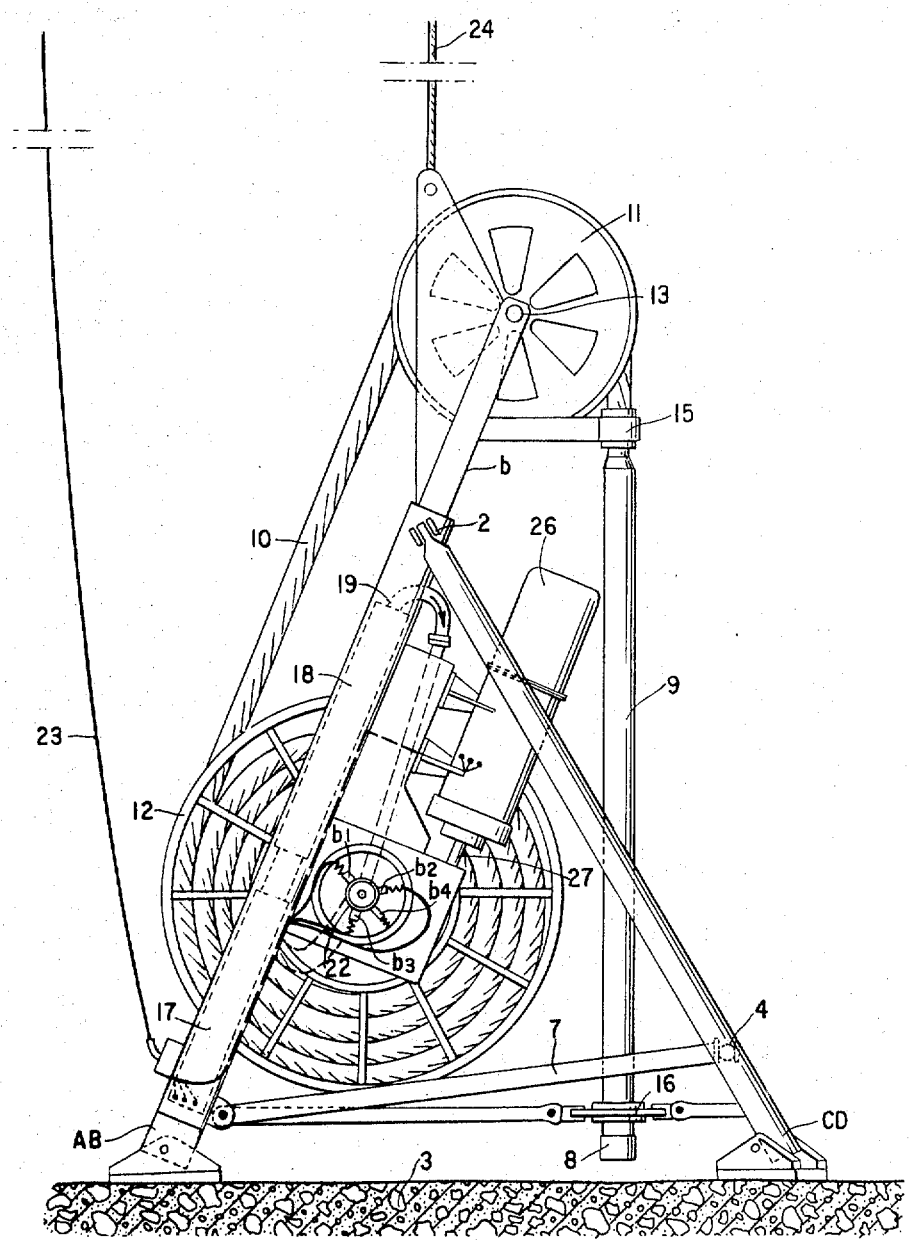
FIGURE 1 shows a side elevation, partly schematic, of a core drilling apparatus according to this invention.
Figure 2:
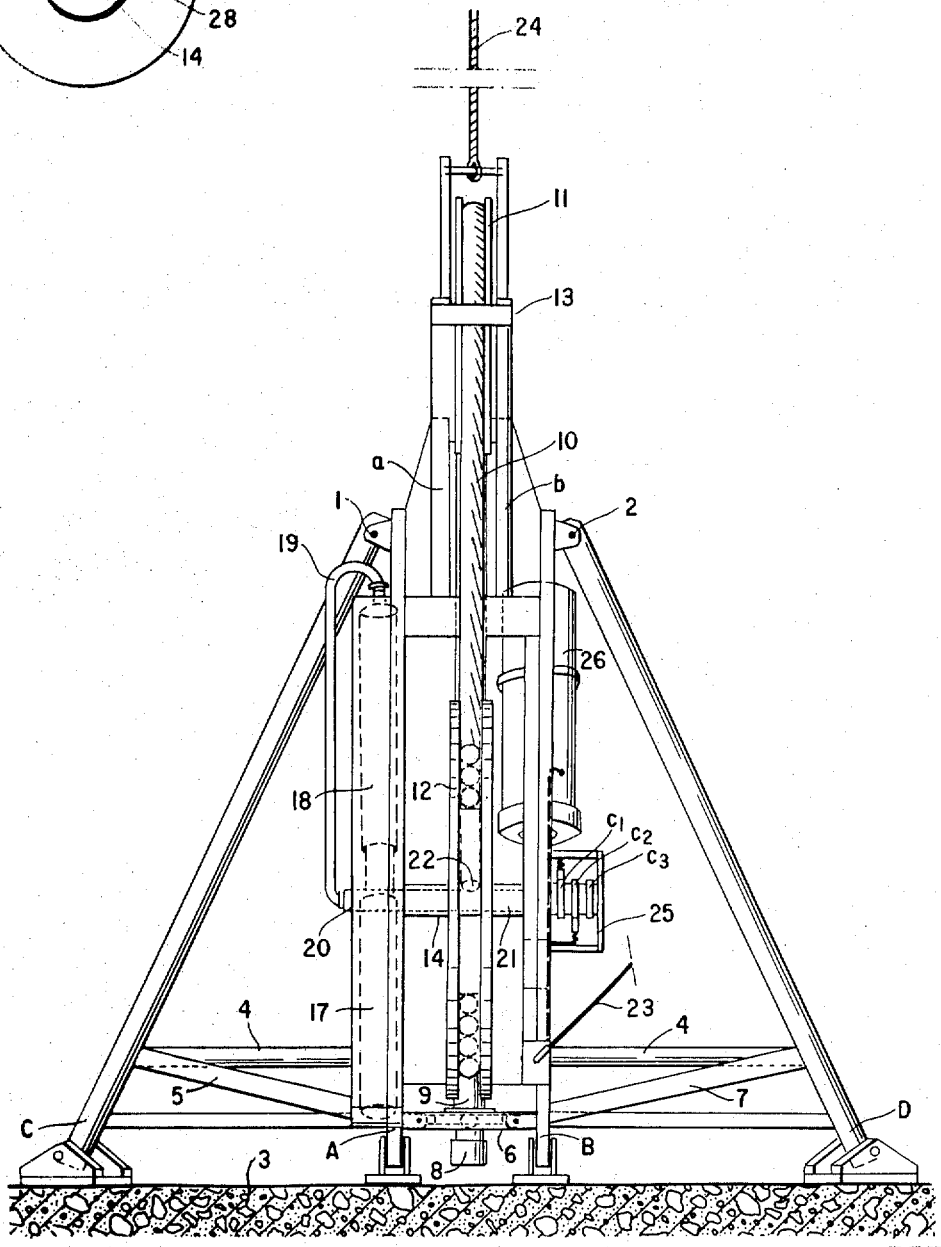
FIGURE 2 is a view from the left side of FIGURE 1.

As is shown in FIGURES 1 and 2, the core drilling apparatus of this invention comprises a four-legged basic structure resting on four legs. A, B, C, D, connected to one another at 1 and 2 and terminating in shoes articulated on axes perpendicular to the longitudinal axis of the corresponding leg, these shoes being designed to rest upon the sea bottom 3.

In order to avoid any deformation of the legs, the latter are connected to one another by junction bars 4, 5, 6 and 7.

The basic structure is connected to a surface installation by means of a cable 24 which permits the core drilling apparatus to be lowered and raised.

The core drill 8 is mounted in the prolongation of a rigid tubular part comprising, in the apparatus shown, an assembly formed by the drill 8 and a bottom motor 9 which, in the apparatus shown, is an electric motor. Alternatively the motor 9 shown in the present embodiment may be a turbine actuated by a stream of water under pressure. This motor 9 driving the drill 8 is at the end of a flexible conduit 10 which passes over a reversing pulley 11 and is wound on a storage reel 12 situated below the pulley 11.

The distance between the bottom of the basic structure and the lower part of the reversing pulley 11 is slightly greater than the length of the rigid tubular part formed of the motor 9 and the core drill 8 so as to permit said rigid tubular part to be lodged in protected position in the interior of the basic structure before and after the core drilling operation, namely during the lowering of the apparatus from the surface installation and its raising from the bottom.

The upper portion of the assembly A and B is made rigid by the props a and b supporting the shaft 13 of the pulley 11. These props are removable so that they may be exchanged if desired, with other props of suitable length and shape in order to adjust the height of the shaft 13 above the bottom of the basic structure to an elevation sufficient to accommodate the rigid tubular part (8, 9). This height is limited only by consideration of stability and maniability of the resulting structure.

The reversing pulley 11 and the storage reel 12 can rotate on parallel horizontal shafts 13 and 14 carried by the basic structure, the shaft 14 being provided with an axial channel 21.

The apparatus also comprises means 15 and 16 for guiding the rigid tubular part (8, 9) along a substantially vertical direction, a motor-pump unit (motor 17 and pump 18) supplying water under pressure through the flexible conduit 10 and through the stationary inner part of the motor 9 to the core drill 8.

This motor-pump unit is advantageously attached to a leg A of the basic structure and the discharge orifice of the pump communicates, through tube 19 and swivel coupling 20, with the axial channel 21 of the shaft 14, which is in communication with the end 22 of the flexible conduit 10.

The feeding with electric current of the motor 17 from the surface installation is effected by means of conductors contained in a cable 23 connected to a current source on the surface installation and which need not be distinct from the supporting cable 24.

If the bottom motor 9 driving the core drill 8 is hydraulic, it can be actuated by the stream of water under pressure from the motor-driven pump 18 which should be sufficiently powerful to enable the drilling fluid to drive the motor.

In the embodiment shown, where the motor 9 is electric, it is energized by a three-phase current supplied from conductors embedded in the walls of the flexible conduit 10, these conductors being connected at the outlet terminal 22 of the flexible conduit respectively to three slip rings $c_1$, $c_2$, $c_3$ insulated from one another and keyed on the shaft 14 of the storage reel.

The slip rings are engaged by three brushes $b_1$, $b_2$, $b_3$ connected to conductors in the cable 23, the brushes being urged against the slip rings by means of springs.

Supplementary slip rings and brushes, such as the brush $b_4$ and the corresponding slip, are to provide continuous electric connections between the control and command conductors in the cable 23 and the corresponding conductors embedded in the thickness of the walls of the flexible conduit 10.

The slip ring brush assembly as enclosed in a watertight box closed by the cover 25 shown in FIG. 2, but which has been removed from FIG. 1 for clarity.

The winding of the flexible conduit 10 upon the storage reel 12 and its unwinding therefrom are controlled by a mechanism 26 adapted to exert a driving or braking torque on a shaft 27 terminating as a worm in mesh with a gear keyed to the axis 14 of the storage reel 12.

Figure 3:
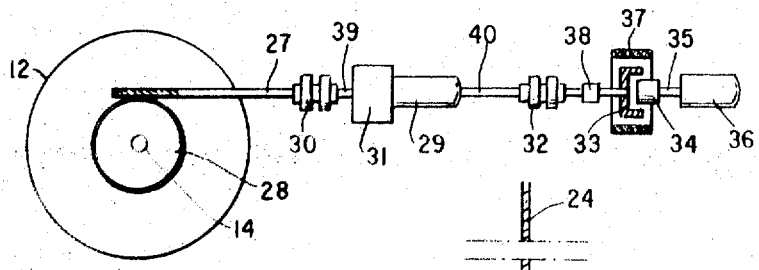
FIGURE 3 shows schematically an arrangement of the means for controlling the winding and unwinding of the flexible conduit on or off the storage reel.

An embodiment of the mechanism 26 for permitting the controlled unwinding and winding up of the flexible conduit 10 is shown schematically in FIG. 3.

FIG. 3 shows the storage reel 12 with its shaft 14, the gear 28 keyed coaxially on this shaft, and the shaft 27 terminating in a helical worm meshing with the gear 28.

The shaft 27 which can transmit either a driving or a braking power, is connected by a suitable clutch 30 to the output shaft 39 of reduction gearing 31 driven by an electric motor 29 whose shaft 40 rotates at a much higher speed than the shaft 27.

By putting the electric motor 29 into rotation, it is possible, by means of the reduction gearing 31 and the gearing 28, to wind up the flexible conduit and to exert a strong force at the periphery of the storage reel 12, even with a motor of low power (3 H.P. e.g.).

The motor 29 can therefore serve to wind up the flexible conduit 10 at the end of the core drilling operation or at any other moment when such a maneuver becomes necessary.

The unwinding of the flexible conduit is usually effected naturally, i.e. spontaneously, by the progressively increasing weight of the conduit with the rigid part attached thereto.

In order to obtain a speed of advance of the conduit which is suitable for core drilling, it is advisable to provide means for controlling the natural rate of unwinding. For this purpose the motor 29 is not energized during the drilling operation but a braking force is applied to the shaft 40 of this motor as described below.

A very small electric motor 36 (of about 1 H.P. e.g.) drives at high speed a plate 34 keyed on its shaft 35, the plate 34 rotating adjacent to but not integral with a second plate 33 driven in rotation by the shaft 40 through a suitable clutch 32.

The direction of rotation of the shaft 35 is opposite to the direction of rotation of the shaft 40 when the flexible conduit unwinds under the effect of the weight of the rigid part (8–9).

A known device 37 is provided to permit voluntary control of the electro-magnetic coupling between the two plates 33 and 34 by means of an electric current of variable strength applied to the terminals of a coil.

As electrically controlled magnetic clutch 37 there may be used that known under the trade mark Elcotron.

The device 37, like the motors 29 and 36, is supplied with electric current from the surface by means of conductors in the cable 23.

When there is no current flowing through the coils of the device 37, there will be no coupling between the plates 33 and 34 and hence between the line of shafts 27, 39, 40 and the shaft 35.

During the operation of the core drilling, the motor 36 being energized by electric current but not the motor 29, the coupling between the plate 33 and 34 can be regulated by controlling the electric current feeding the coils of the device 37, thereby exerting a tangential braking effect at the side of the storage reel 12 in opposition to the tangential force exerted by the weight of the rigid art (8–9) and of the unwound portion of the conduit 10, which tends to further unwind the flexible conduit.

This braking effect, which can be regulated from a control switch board at the surface by regulating the current flowing through the coils of the coupling device 37, makes it possible to control from the surface the advance of the submarine core drill.

The motor 36, which serves normally to exert a braking effect during the forward movement of the core drill as described above, can be energized at the same time as the coils of the device 37 and the motor 29 during the rewinding operation, the coupling between the shafts 35 and 40 being regulated by means of the device 37.

These shafts will then have the same direction of rotation, which will assist the motor 29 during this rewinding operation.

A supplementary device 38 is included in the line of shafts. It is an electro-magnetic brake of a known kind, exerting its maximum braking power, resulting in a locking of the reel by action of springs, when not energized by an electric current.

A commercially available brake of this type is known under the trademark Tourco.

When such brake is not energized, it blocks the rotation of the line of shafts, thereby preventing any undesired unwinding of the flexible conduit during any of the lowering or raising movements of the apparatus between the sea bed and the surface installation.

The circuit for energizing the brake 38 can be advantageously designed in such a manner that a delivery of current to either of the two motors 29 or 36 will simultaneously result in a delivery of current to the device so as to release the brake 38.

In certain cases it can be advantageous to assist the unwinding of the flexible conduit 10 which occurs, normally as the effect of gravity acting on the portion already unwound. For this purpose the directions of rotation of motors 29 and 36 can be reversed by reversal of the polarities of the energizing currents.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A submarine core drilling apparatus adapted to be positioned on the water bottom from a surface installation, said apparatus comprising a basic structure, a supporting cable connecting the latter to said surface installation, a core drill, a bottom motor driving said core drill in rotation, said core drill and said motor constituting a rigid tubular part of said core drilling apparatus, a flexible conduit having a first end and a second end, said first end being connected to said rigid tubular part to the end thereof oposite to said core drill, a motor-driven pump for delivering water under pressure to said core drill, having a discharge orifice connected to said second end of said flexible conduit, said motor-driven pump being secured to said basic structure, said rigid tubular part having an internal passageway for delivering water under pressure from said flexible conduit to said core drill, said motor-driven pump being connected by electric conductors to a current source of said surface installation, said basic structure comprising means for guiding said rigid tubular part, said core drilling apparatus further comprising a storage reel for said flexible conduit mounted on said basic structure and having a shaft provided with an axial channel whereinto opens said second end of said flexible conduit, a swivel joint connecting said axial channel to the discharge orifice of said motor-driven pump, said core drilling apparatus also comprising [electric] means for controlling the unwinding and rewinding of said flexible conduit on said storage reel, said core drilling apparatus being connected to said surface installation by electric power cables and [electric control conductors] *means for remote control.*

2. The apparatus of claim 1, in which said bottom motor which drives said core drill is a hydraulic motor actuated by the water under pressure which is delivered by said motor-driven pump.

3. The apparatus of claim 1, in which said bottom motor which drives said core drill is an electric motor, said core drilling apparatus comprising electric conductors for energizing said bottom motor and embedded in said flexible conduit and a plurality of slip rings insulated from one another and each connected to one of said electric conductors, said slip rings being keyed on the shaft of said storage reel, a plurality of brushes each urged into electrical contact with one of said slip rings, said brushes being connected by means of electric conductors to said electric current source on said surface installation.

4. The apparatus of claim 1, in which said [electric] means for controlling the unwinding and rewinding operations of said flexible conduit on said storage reel comprises a combination of a first electric motor and a second electrc motor, of which said first electro motor drives directly a reduction gearing connected to said shaft of said storage reel, and a device for regulating the coupling between said two motors, said motors and said coupling device being connected by power conductors and control conductors respectively to said surface installation, said core driving apparatus also comprising an electromagnetic brake locking said storage reel when not energized and releasing the same when actuated by an electric current.

*5. The apparatus of claim 1, in which said means for remote control is electric control conductors.*

References Cited

The following references, cited by the Examiner, are of record in the patented file of this patent or the original patent.

UNITED STATES PATENTS

| | | | |
|---|---|---|---|
| 2,013,070 | 9/1935 | Sheridan | 175—103 X |
| 2,548,616 | 4/1951 | Priestman et al. | 175—103 X |
| 2,665,885 | 1/1954 | Gignoux | 175—6 |
| 2,807,439 | 9/1957 | Lipscomb | 175—6 |
| 3,125,171 | 3/1964 | Stewart | 175—5 |
| 3,204,708 | 9/1965 | Berne | 175—6 |

MARVIN A. CHAMPION, Primary Examiner

R. E. FAVREAU, Assistant Examiner

U.S. Cl. X.R.

175—22